US011333141B2

(12) United States Patent
Steinbrunn

(10) Patent No.: US 11,333,141 B2
(45) Date of Patent: May 17, 2022

(54) CYLINDER HEAD COVER FOR A REFRIGERANT COMPRESSOR

(71) Applicant: SECOP GMBH, Flensburg (DE)

(72) Inventor: Rolf Steinbrunn, Großenwiehe (DE)

(73) Assignee: SECOP GMBH, Flensburg (DE)

( * ) Notice: Subject to any disclaimer, the term of this patent is extended or adjusted under 35 U.S.C. 154(b) by 186 days.

(21) Appl. No.: 16/315,520

(22) PCT Filed: Jul. 3, 2017

(86) PCT No.: PCT/EP2017/066494
§ 371 (c)(1),
(2) Date: May 23, 2019

(87) PCT Pub. No.: WO2018/007313
PCT Pub. Date: Jan. 11, 2018

(65) Prior Publication Data
US 2019/0277540 A1 Sep. 12, 2019

(30) Foreign Application Priority Data

Jul. 6, 2016 (AT) .............................. GM50122/2016

(51) Int. Cl.
*F04B 39/12* (2006.01)
*F04B 53/10* (2006.01)
(Continued)

(52) U.S. Cl.
CPC ........ *F04B 39/125* (2013.01); *F04B 39/1073* (2013.01); *F04B 39/14* (2013.01);
(Continued)

(58) Field of Classification Search
CPC .... F04B 39/125; F04B 53/1047; F04B 39/14; F04B 39/1073; F04B 53/1085;
(Continued)

(56) References Cited

U.S. PATENT DOCUMENTS

| 590,749 A | 9/1897 | Zea |
| 4,978,285 A | 12/1990 | DaCosta |

(Continued)

FOREIGN PATENT DOCUMENTS

| CN | 1138668 A | 12/1996 |
| DE | 205328 | 12/1983 |

(Continued)

OTHER PUBLICATIONS

Written Opinion in PCT/EP2017/066494, 6 pages, filed Jul. 3, 2017.
English Translation of International Search Report in PCT/EP2017/066494, 3 pages, dated Apr. 10, 2017.

*Primary Examiner* — Bryan M Lettman
(74) *Attorney, Agent, or Firm* — McKee, Voorhees & Sease, PLC

(57) ABSTRACT

A cylinder head cover for a coolant compressor, wherein the cylinder head cover is attachable to a cylinder head arrangement in order to form a hollow space for receiving a coolant compressed by the piston, wherein the cylinder head arrangement comprises a valve plate attached to the cylinder housing and having an outlet opening and an outlet valve, which closes the outlet opening in cycles and consists of a valve spring and a stop plate for delimiting an opening movement of the valve spring. In order to achieve a cost-efficient production and installation of the cylinder head cover while assuring a secure support of the stop plate, it is provided that the cylinder head cover can comprise at least two contact surfaces for supporting stop plates of different outlet valves in order to adjust different opening positions of the valve springs of the different outlet valves.

26 Claims, 3 Drawing Sheets

(51) Int. Cl.
*F04B 39/14* (2006.01)
*F04B 39/10* (2006.01)
*F16K 7/17* (2006.01)
*F16K 15/16* (2006.01)
*F04B 53/22* (2006.01)

(52) U.S. Cl.
CPC ...... *F04B 53/1035* (2013.01); *F04B 53/1037* (2013.01); *F04B 53/1047* (2013.01); *F04B 53/1085* (2013.01); *F04B 53/22* (2013.01); *F16K 7/17* (2013.01); *F16K 15/16* (2013.01)

(58) Field of Classification Search
CPC .......... F04B 53/1035; F04B 53/1037–53/107; F04B 53/22; F16K 7/17; F16K 15/16; F16K 15/14; Y10T 137/5109
See application file for complete search history.

(56) References Cited

U.S. PATENT DOCUMENTS

| | | |
|---|---|---|
| 5,249,939 A | 10/1993 | Takahashi |
| 2002/0157717 A1 | 10/2002 | Hong |
| 2004/0202563 A1* | 10/2004 | Seo ..................... F04B 39/1073 417/569 |
| 2009/0010788 A1* | 1/2009 | Yamaoka ............ F04B 39/1073 417/460 |
| 2009/0291007 A1* | 11/2009 | Yamaoka ............ F04B 39/1073 417/569 |

FOREIGN PATENT DOCUMENTS

| | | |
|---|---|---|
| DE | 19906550 A1 | 8/1999 |
| EP | 0437314 A1 | 7/1991 |
| WO | 2007037239 A1 | 4/2007 |
| WO | 2018007313 A1 | 1/2018 |

* cited by examiner

CYLINDER HEAD COVER FOR A REFRIGERANT COMPRESSOR

CROSS-REFERENCE TO RELATED APPLICATION

This application claims benefit under 35 U.S.C. § 119 or § 120 to Austrian application Serial. No. GM 50122/2016 filed Jul. 6, 2016, herein incorporated by reference in its entirety.

FIELD OF THE INVENTION

The invention relates to a cylinder head cover for a coolant compressor comprising an electric drive unit, a cylinder housing with a cylinder head arrangement, a crankshaft drivable by the electric drive unit, and a piston driven by the crankshaft, guided in the cylinder housing and compressing the coolant, wherein the cylinder head cover is attachable to the cylinder head arrangement in order to form a hollow space for receiving a coolant compressed by the piston, wherein the cylinder head arrangement comprises a valve plate attached to the cylinder housing and having an outlet opening and an outlet valve, which closes the outlet opening in cycles and consists of a valve spring and a stop plate for delimiting an opening movement of the valve spring, and a coolant compressor and a compressor family with coolant compressors with a different cooling capacity.

BACKGROUND OF THE INVENTION

Coolant compressors, particularly hermetically encapsulated coolant compressors, have been known for a long time and are predominantly used in refrigerators and refrigerated shelves. The coolant process as such has also been known for a long time. A coolant is heated and subsequently overheated in an evaporator through energy absorption from the space to be cooled, and by means of the coolant compressor, also called refrigerant compressor, it is translationally pumped by a piston, moving in a cylinder housing, to a higher pressure level, where the coolant gives off heat via a condenser, and via a throttle, in which a pressure reduction and a cooling of the coolant takes place, it is transported back into the evaporator. The movement of the piston is realized via a crankshaft driven by the electric drive unit.

Depending on the requirements, such coolant compressors are provided with different cooling capacities. The cooling capacity of a coolant compressor is determined by the electric drive unit to be used, for example, the power of an electric motor. However, the displacement of the cylinder housing, the size of the piston, and the stroke itself are also essential for determining the cooling capacity because the quantity of the coolant condensable in one compression stroke is determined via the geometric relationships.

In order to close the compression space of the cylinder housing, i.e. the cylinder itself, a cylinder head arrangement is attached to the cylinder housing, wherein the cylinder head arrangement comprises a valve plate, having an outlet opening and a suction opening, and a cylinder head cover which forms a hollow space with the valve plate for receiving the compressed coolant. During the suction stroke, the outlet opening in the valve plate is closed by a valve spring which is arranged on the side of the valve plate facing the cylinder head cover. During the compression stroke, the dynamic pressure on the valve spring increases until it opens in a defined crank angle range in order to allow for the transfer of the compressed coolant into the hollow space in the cylinder head cover or into the pressure section.

The dynamic pressures acting on the valve spring, which vary depending on the design of the coolant compressor, accelerate the valve spring during the opening process. In order to delimit the opening movement of the valve spring, thus preventing an overloading of the valve spring, the cylinder head arrangement comprises a stop plate which predetermines the position of the valve spring in an open position by its shape and positioning. In other words, in the opening position, the valve spring bears against the stop plate, and so a further opening movement of the valve spring is prevented by the stop plate. By determining the open position of the valve spring by means of the stop plate, it can further be prevented that the valve spring opens too far, resulting in a return flow, the so-called backflow, of the coolant from the hollow space into the cylinder housing during the closing movement of the valve spring. Usually, the stop plate is supported by the inner side of the cylinder head cover in order to absorb the force applied by the valve spring. The stop plate and the valve spring form an outlet valve, wherein the dimensioning of the outlet valve depends on the displacement of the coolant compressor and the mass flow transferring into the hollow space during the exhaust stroke.

For example, EP 0 437 314 A1 discloses a cylinder head for a coolant compressor, wherein the outlet valve comprises a diaphragm valve and an auxiliary diaphragm valve. The diaphragm valve and the auxiliary diaphragm valve have different elastic modules. The cylinder head cover comprises a stop element with a stop surface for the diaphragm valves, said stop element extending in the direction of the diaphragm valves, and so the diaphragm valves bear against the stop surface during an open position.

WO 2007/037239 A1 shows a cylinder head with a valve plate, wherein a stop element having recesses is formed by the cylinder head cover, and so the valve spring has different spring rigidities, which depend on the stop element recess that the valve spring bears against.

However, the prior art has the disadvantage that for different coolant compressors of a compressor family, which essentially have the same structure but differ with regard to cooling capacity and/or displacement, each cylinder head arrangement has an outlet valve adjusted specifically to the cooling capacity, the displacement, and the mass flow of the cooling compressor. The different outlet valves each comprise differently designed stop plates which delimit the opening movement of the valve spring in different positions. As a result, a cylinder head cover adjusted to the corresponding stop plate must be installed on the cylinder head arrangement in order to be able to correctly adjust the opening position of the valve spring for operation, or to adjust the opening movement of the valve spring to the requirements of the cooling compressor and to determine the position of the stop plate of the outlet valve. Therefore, in an assembly line, a specifically designed outlet valve with a corresponding stop plate and a cylinder head cover also designed specifically for each compressor type must be provided, which requires high manufacturing costs for the production of the different components and increases the installation costs because different movements for manipulation are required.

PROBLEM ADDRESSED BY THE INVENTION

Therefore, the problem addressed by the invention is that of overcoming the disadvantages of the prior art and proposing a cylinder head cover of a coolant compressor which can be produced and installed more cost-efficiently but ensures a secure support of the stop plate.

SUMMARY OF THE INVENTION

This problem is solved in a cylinder head cover according to the invention for a coolant compressor comprising an electric drive unit, a cylinder housing with a cylinder head arrangement, a crankshaft drivable by the electric drive unit, and a piston driven by the crankshaft, guided in the cylinder housing and compressing the coolant, wherein the cylinder head cover is attachable to the cylinder head arrangement in order to form a hollow space for receiving a coolant compressed by the piston, wherein the cylinder head arrangement comprises a valve plate attached to the cylinder housing with an outlet opening and an outlet valve, which closes the outlet opening in cycles and consists of a valve spring and a stop plate for delimiting an opening movement of the valve spring, characterized in that the cylinder head cover comprises at least two contact surfaces for supporting the stop plates of different outlet valves in order to allow for different opening positions of the valve springs of the different outlet valves.

The design of the cylinder head cover according to the invention makes it possible to use one single cylinder head cover for a multiplicity of different coolant compressors because each of the different contact surfaces of the cylinder head cover is provided for one specific stop plate. As a result, the opening movement of the valve spring can be delimited in a defined position by means of a stop plate of an outlet valve which bears against one of the contact surfaces. Since at least two contact surfaces are provided, the opening movement of valve springs of different outlet valves can be delimited differently and thus be adjusted to different cooling capacities of the coolant compressor. Each of the contact surfaces is provided for one stop plate, and so different opening positions for the valve springs of the different outlet valves are adjustable by the stop plate contacting the corresponding contact surface provided for that purpose.

For example, if four contact surfaces are provided, the cylinder head cover can be used for at least four different coolant compressors or coolant compressor types, wherein each of the coolant compressors has a different outlet valve. The contact surfaces are adjusted to the corresponding dimensions of the stop plates of the different outlet valves, and so four different opening positions of the valve spring of the different outlet valves are adjustable with only one cylinder head cover. However, at least two contact surfaces are required in order to be able to use the cylinder head cover for more than one cooling capacity or for more than one coolant compressor type.

Due to the contact surfaces, which predetermine the position of the correspondingly assigned stop plates, the opening movement of the valve spring can thus be adjusted to the piston displacement of the piston or the resulting mass flow. It goes without saying that each cylinder head arrangement has only one outlet valve, and thus never more than only one stop plate bearing against a contact surface is arranged in a coolant compressor.

An embodiment of the invention provides that the cylinder head cover has a support element which forms the contact surfaces, and two adjacent contact surfaces are formed by one, preferably stepped, recess of the support element. The support element, for example, can, in a one-piece design, be a bulge of the cylinder head cover, and in a multi-piece design, it can be an element, such as a pin, fastened in the cylinder head cover in a form-locking and/or force-locking manner. By means of the support element, the distance between a sealing surface of the cylinder head cover and the contact surfaces can be reduced, or the stop plate can be supported by the contact surface of the support element which is closer to the sealing surface. The arrangement of all contact surfaces on a common support element allows for the simple production of the contact surfaces because they can be manufactured in a single process; for example, the steps can be milled. Due to the step shape, the contact surfaces can furthermore be adjusted in a simple manner to the provided opening position of the stop plate.

A further embodiment of the invention provides that the cylinder head cover comprises a continuous sealing surface for sealing the hollow space delimited by the valve plate, and that the contact surfaces are arranged at a varying standard distance from the sealing surface. As a rule, the sealing surface is designed to be flat, and in the operating state, it bears against the valve plate, wherein a sealing element, for example, a flat seal made of plastic or paper, is usually arranged between the sealing surface and the valve plate. In a preferred embodiment, the sealing surface can have a, preferably continuous, bulge in order to secure the sealing element and prevent that the sealing element is pushed out during operation. When the sealing element has a small thickness, for example, smaller than 0.25 mm, particularly smaller than 0.10 mm, the distance between the sealing surface and the contact surfaces is essentially equal to the distance between the contact surfaces and the valve plate in the operating state. However, when the thickness of the sealing means is not negligible, for example, is greater than 0.25 mm, lies particularly between 0.5 mm and 1 mm, for example, at 0.76 mm, the thickness of the sealing means must be taken into account for the dimensioning of the contact surfaces. For example, the opening height of the valve spring can be increased or reduced with the selection of a sealing means with corresponding thickness. Due to the different distances of the contact surfaces from the sealing surface, different positions for different stop plates can be determined in a particularly simple manner. The geometry of the stop plate can also be simplified because the opening positions of the valve spring are predetermined to the greatest extent due to the exact definition of the contact surface in combination with the geometry of the stop plate. As a rule, the standard distance is measured parallel to the normal vector of the sealing surface. The standard distance lies between 1.5 mm and 8 mm, preferably between 3 mm and 7 mm, particularly preferably between 4 mm and 6 mm, particularly 5 mm +/−0.5 mm. In other words, the standard distances of the contact surfaces are selected such that in the opening position of the valve spring, which is defined by the corresponding contact surface, the opening height, measured along a longitudinal axis of the outlet opening between the valve plate and the valve spring, lies between 0.8 mm and 3.0 mm, preferably between 1.0 mm and 2.8 mm, particularly preferably between 1.2 mm and 2.6 mm, particularly between 1.6 mm and 1.8 mm. In case of two contact surfaces, a combination, for example, of 0.8 mm and 2.4 mm or 0.9 mm and 2.2 mm or 1.0 mm and 1.8 mm opening height is conceivable, to mention but a few possibilities.

According to a further embodiment of the invention, the height difference between the contact surface arranged closest to the sealing surface and the contact surface arranged furthest from the sealing surface lies in a range between 0.2 mm and 2.6 mm, preferably between 0.4 mm and 2.0 mm, particularly preferably between 0.6 mm and 1.6 mm, particularly between 0.8 mm and 1.2 mm. Therefore, values, such as 1 mm, 1.4 mm, 1.8 mm, 2.2 mm, or 2.4 mm are conceivable. With the two maximum values, the largest opening position of the valve spring and the smallest opening position of the valve spring are determined, which, among others, correspond to the largest and the smallest displacement of a coolant compressor of the compressor family or the speed of the coolant compressor of the compressor family. The height difference is also measured as the standard distance. Unless the contact surfaces are arranged parallel to the sealing surface, the measurements refer to the edge of the step. It has become apparent that with a height difference in the range between 0.2 mm and 2.6 mm, different outlet valves for coolant compressors with displacements between 15 $cm^3$ and 21 $cm^3$ with a structurally identical cylinder head cover can be supported.

In order to allow for a particularly fine balancing of the contact surfaces, a further embodiment of the invention provides that the height difference between two adjacent contact surfaces lies between 0.2 mm and 2 mm, preferably between 0.4 mm and 1.6 mm, particularly between 0.6 mm and 1 mm. Therefore, values, such as 0.5 mm, 0.8 mm, 1.2 mm, 1.4 mm, 1.5 mm, or 1.8 mm are conceivable.

In a preferred embodiment of the invention, it is provided that the contact surfaces are designed to be curved and preferably adjusted to the shape of the stop plates of different outlet valves. As a result, the supporting effect of the contact surfaces on the stop plates can be increased because, as a rule, the stop plates are curved, when in the operating state. Due to the curved design of the contact surfaces, the deformation of the stop plate by the contact surface is reduced, while the surface, on which the stop plate bears against the contact surface, is simultaneously enlarged according to amount.

However, the production of the contact surfaces is particularly simple and economical, when they are aligned parallel. The production can be further simplified, when the contact surfaces are designed to be flat and are also aligned parallel to the sealing surface. According to a further preferred embodiment, it is thus provided that the contact surfaces are aligned parallel to one another, and preferably parallel to the sealing surface. Due to the parallel arrangement of the contact surfaces, the effective standard distance is impervious to the positioning accuracy of the stop plate.

A particularly preferred embodiment provides that the support element comprises a first and a second contact surface, wherein the first contact surface is designed to support the stop plate of a first cutlet valve in order to adjust a first opening position of the valve spring of the first outlet valve, and wherein the second contact surface is designed to support the stop plate of an alternative outlet valve in order to adjust an alternative opening position of the valve spring of the alternative outlet valve. With a thus designed cylinder had cover, two different outlet valves for at least two different coolant compressors can be secured in a simple manner.

The invention also relates to a coolant compressor having an electric drive unit, a cylinder housing, a crankshaft drivable by the electric drive unit, and a piston driven by the crankshaft, guided in the cylinder housing and compressing the coolant, wherein a cylinder head arrangement with a valve plate, which comprises an outlet opening, and an outlet valve is fastened to the cylinder housing, wherein the outlet valve comprises a valve spring, which closes the outlet opening in cycles, and a stop plate arranged on the valve plate for delimiting the opening movement of the valve spring, and a cylinder head cover, which supports the stop plate, is fastened to the cylinder head arrangement. The design of the cylinder head cover according to the invention allows for a flexible use of structurally identical cylinder head covers in a plurality of different coolant compressors or coolant compressor types with different outlet valves. Since the contact surfaces are adjusted to the different outlet valves, the stop plate of the outlet valve installed in the coolant compressor is supported by precisely one contact surface, namely the one provided for that purpose, while the remaining contact surfaces are not assigned. The engaged contact surface differs, depending on the coolant compressor or type of coolant compressor that the cylinder head cover is attached to. During installation, no verification is required: If the correct outlet valve is preinstalled on the valve plate, it automatically engages with the matching contact surface.

In a further embodiment of the coolant compressor according to the invention, it is provided that the stop plate comprises a fastening section attached to the valve plate and a, preferably curved, free section for delimiting the opening movement of the valve spring, wherein an end portion of the free section bears against one of the contact surfaces. Usually, the fastening section is riveted to the valve plate while the free section is designed to be curved in order to form the bending line of the valve spring, and so, in the opening position in the area of the projection of the outlet opening, it can bear against the free section with its entire surface.

A further embodiment provides that the stop plate is pre-stressed between the corresponding contact surface and the valve plate. When the cylinder head cover is attached to the cylinder housing, the stop plate is pushed in the direction of the valve plate and is thus pre-stressed, when in the operating state. As a result, the production tolerances of the stop plate are compensated, and the stability of the stop plate attached in the cylinder head is increased during operation.

According to a further embodiment of the coolant compressor according to the invention, it is provided that the contact surface with the shortest distance from the longitudinal axis of the outlet opening in radial direction is arranged at a first standard distance from the valve plate, and the standard distances of the remaining contact surfaces are reduced from contact surface to contact surface, the further away they are from the longitudinal axis. In order to adjust the opening position of the different valve springs, it is particularly advantageous, when the contact surfaces have different standard distances to the valve plate. As a result, the geometry of the stop plate can be kept particularly simple. In terms of the outlet opening, which is closed and released by the valve spring in cycles, the fastening section of the stop plate, which also corresponds to the fastening section of the valve spring, is arranged on one side of the outlet opening, and the contact surfaces are arranged on the opposite of the outlet opening. With increasing distance of the contact surfaces from the longitudinal axis of the outlet opening (and thus from the fastening section), the standard distance between the respective contact surface and the valve plate decreases, and so the first contact surface arranged in radial direction closest to the longitudinal axis has the greatest standard distance. As a result, an opening position of the valve spring can be adjusted to a great opening height via the first contact surface by means of the stop plate, while the subsequent contact surfaces, each allow for, preferably stepped, smaller opening heights. Correspondingly, the contact surface furthest away from the longitudinal axis has the smallest standard distance and thus allows for the smallest opening height of the valve spring. In other words, due to the contact surfaces arranged at different standard distances, only the length of the stop plates of the different outlet valves has to be changed in order to achieve that the end portion of the free section of the stop plate bears against the correct contact surface.

A preferred embodiment of the coolant compressor according to the invention provides that the contact surfaces are arranged relative to the valve plate, preferably at different standard distances, such that an opening height of the valve spring in the opening position defined by the corresponding contact surface lies between 0.8 mm and 3.0 mm, preferably between 1.0 mm and 2.8 mm, particularly preferably between 1.2 mm and 2.6 mm, particularly between 1.6 mm and 1.8 mm, wherein the opening height of the valve spring is defined as the maximum distance between the valve plate and the valve spring, measured along a longitudinal axis of the outlet opening. The opening height of the valve springs is a relevant frame size and dimensioning size in the field of coolant compressors.

However, depending on the design of the cylinder head cover, the standard distances can vary greatly. However, the opening height is the relevant variable predetermined for the proper operation of the coolant compressor. With the appropriate spacing of the respective contact surfaces from the valve plate, it is thus possible to define an opening height of a valve spring which lies in the range between 0.8 mm and 3 mm. If two contact surfaces are provided on the cylinder head cover, a first contact surface is arranged such, for example, that the opening height of the valve spring is 1.0 mm in the opening position, and a second contact surface is arranged such that the opening position of the valve spring is 1.8 mm. Correspondingly, for example, combinations of 1.0 mm and 2.8 mm, of 1.2 mm and 2.6 mm, of 1.6 mm and 2.4 mm, or any other combination are possible.

The initial problem addressed is also solved by a compressor family with coolant compressors according to the invention, having a different cooling capacity due to different displacements, wherein, depending on the displacement of the piston, a different outlet valve is attached to the valve plate, wherein a cylinder head cover according to the invention supports the stop plate of the outlet valve on one of the contact surfaces, and so structurally identical cylinder head covers can be used for the entire compressor family. As initially described, the coolant compressors of a compressor family differ, for example, with regard to differently strong drive units or displacements, wherein the cylinder head arrangements generally only differ with regard to different outlet valves, wherein, however, the fastening section for the cylinder head cover is designed analogously. Due to the use of a cylinder head cover according to the invention, coolant compressors of the compressor family with cylinder head arrangements comprising different outlet valves can now be closed and sealed by means of structurally identical cylinder head covers. The installation is particularly simple because the contact surfaces of the cylinder head cover are adjusted to the stop plates of the different outlet valves. For example, one of the contact surfaces is designed for the stop plate of a first outlet valve, which determines a first opening position of the valve spring; a further contact surface is designed for a stop plate of a second outlet valve, which determines a second opening position of the valve spring which differs from the first opening position. The number of different contact surfaces depends on the different properties of the coolant compressors of the compressor family, depending on how many compressor types require a different opening position of the valve spring, and on the installation space available in the cylinder head cover because each contact surface must have a predetermined minimum size in order to be able to fulfill the support function and, if applicable, the clamping function.

A further embodiment of the invention provides that the lengths of the free sections of the stop plates of the different outlet valves differ from one another. A different curvature of the stop plates, preferably adjusted to the opening position of the valve spring, i.e. following the bending line of the valve spring, can also be provided. In particular, when the contact surfaces are arranged at different distances to the longitudinal axis of the outlet opening, and the individual contact surfaces are arranged at different standard distances from the valve plate, the opening position of the valve spring can be adjusted solely by means of the length of the free section of the stop plate if they are adjusted to the different positions of the contact surfaces. The stop plates protrude in an oblique or curved manner from the valve plate and with their end portion contact the contact surface assigned to the outlet valve. When the cylinder head cover is installed on the cylinder housing, the cylinder head cover advantageously pushes the free section of the stop plate in the direction of the valve plate and puts the stop plate under prestress, wherein the stop plate is thus moved to its end position. The individual elements, i.e. cylinder head cover with contact surfaces and stop plates, are easily produced and installed particularly easily and cost efficiently.

BRIEF DESCRIPTION OF THE DRAWINGS

In the following, the invention shall be described in more detail using embodiments. The drawings are exemplary and supposed to demonstrate the inventive idea but not limit it or even describe it exhaustively.

DETAILED DESCRIPTION OF EXEMPLARY EMBODIMENTS OF THE INVENTION

Figure 1:
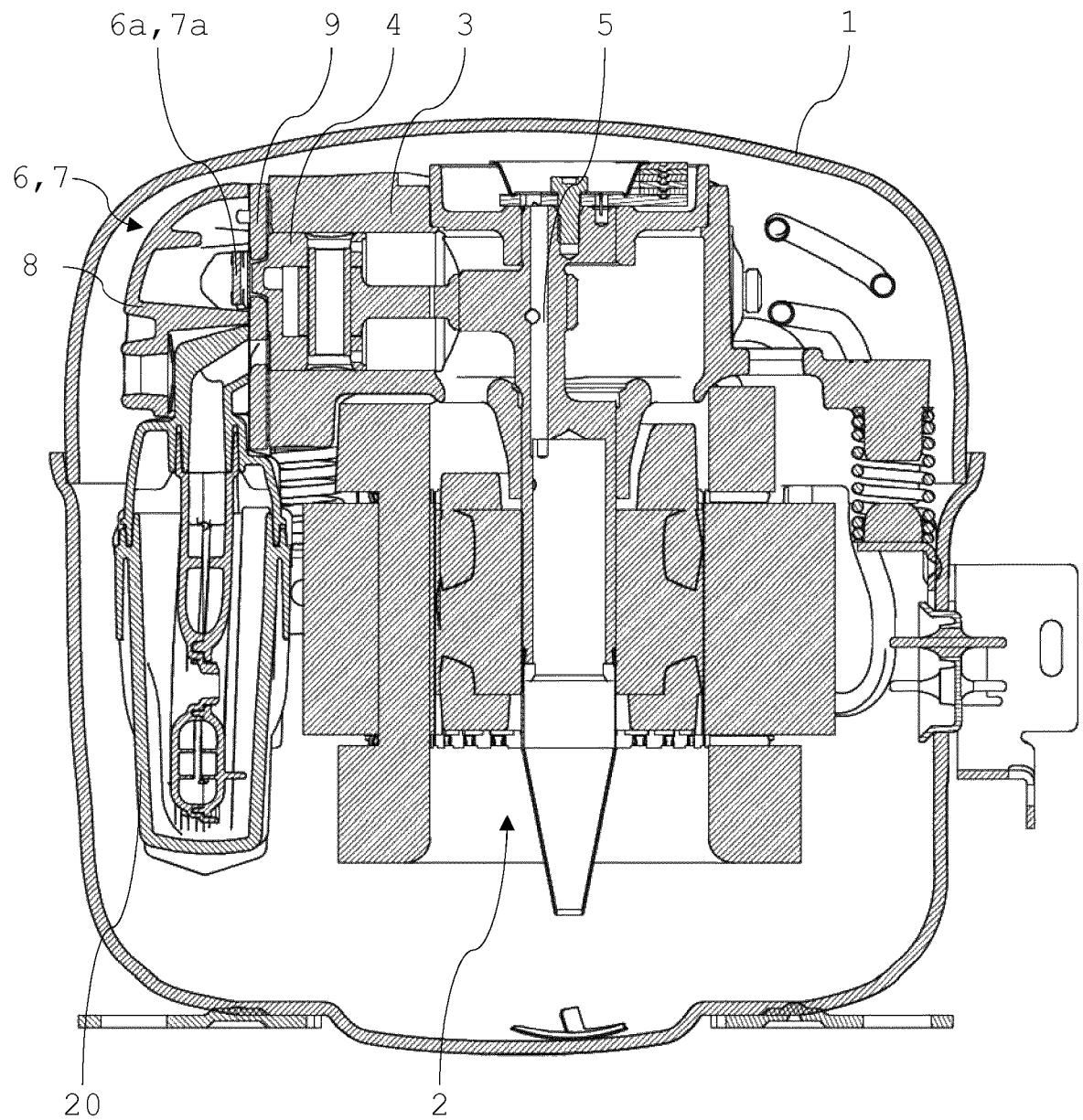
FIG. 1 shows a cutaway view of a coolant compressor.

FIG. 1 shows a cutaway view of a coolant compressor according to the invention, wherein the individual components are arranged within a, preferably hermetically encapsulated, compressor housing 1. The coolant compressor comprises an electric drive unit 2, which is designed as an electric motor with a rotor and a stator, a crankshaft 5, which is drivable by means of the drive unit 2, and a cylinder housing 3, in which a piston 4 is translationally movable and driven by the crankshaft 5. In a generally known manner, during the suction stroke, coolant is suctioned via a suction silencer 20 and a suction valve into the cylinder of the cylinder housing 3 or the compression space and compressed to a higher pressure level during the subsequent compression stroke. At the end of the compression stroke, the coolant compressed by the piston movement is ejected via an outlet valve 6,7 and transferred to a pressure section.

In order to ensure the functionality, a cylinder head arrangement 21 is provided which comprises a valve plate 9, by means of which the cylinder is closed. The valve plate 9 comprises a suction opening, which can be closed in cycles by the suction valve, and an outlet opening 11, which can be closed in cycles by the outlet valve 6,7, and by means of which the coolant reaches or leaves the cylinder. The valve plate 9 is clamped by a cylinder head cover 8 to the cylinder housing 3, wherein sealing elements 15, for example, flat seals made of plastic or paper, are usually arranged between the valve plate 9 and the cylinder head cover 8 or between the valve plate 9 and cylinder housing 3. The cylinder head cover 8, together with the valve plate 9, forms a hollow space, which the compressed coolant enters from the compression space via the outlet valve 6,7.

As a rule, coolant compressors are manufactured as part of a compressor family, wherein the individual coolant compressor types differ with regard to their cooling capacity. The different cooling capacities can be adjusted by a different dimensioning of the drive unit 2 and/or by displacements of different sizes. However, within the compressor family, the usual structural measures vary only slightly. Due to the different cooling capacity, the mass flows of the coolant which enter the hollow space formed by the cylinder head cover 8 via the outlet valve 6,7 during the exhaust stroke also differ. Therefore, the outlet valves 6,7 must be designed differently in different coolant compressor types of a compressor family.

As shown in FIGS. 2 and 3 using the invention, an outlet valve 6,7 comprises a valve plate 10 and a stop plate 6a,7a for the valve spring 10, wherein the stop plate 6a,7a delimits the opening movement of the valve spring 10, thus defining an opening movement of the valve spring 10. During the compression stroke, the dynamic pressure on the valve spring 10 increases, until the valve spring 10 opens. At a defined dynamic pressure, which is reached in a defined crank angle range, this results in an opening of the valve spring 10, which is accelerated during the opening. In order to prevent an overload of the valve spring 10, the stop plate 6a,7a for delimiting the opening movement of the valve spring 10 is provided. In the opening position, the valve spring 10, at least in the area of the projection of the outlet opening 11 on the stop plate 6a,7a, bears against the stop plate 6a,7a with its entire surface and cannot be opened any further. Similar to the valve spring 10, the stop plate 6a,7a is attached, preferably riveted, to the valve plate 9. According to the prior art, the stop plate 6a,7a is supported by the inner side of the cylinder head cover 8. However, in the prior art, this results in the following disadvantages: Since the stop plates 6a,7a of different outlet valves 6,7, determine the corresponding different opening positions of the valve springs 10, and require a counterpart for support in the cylinder head cover 8, the cylinder head cover 8 must be adjusted precisely to the corresponding outlet valve 6,7 in order to be able to support the stop plate 6a,7a in the right position. It thus requires a concrete combination of an outlet valve 6,7 and a cylinder head cover 8 adjusted to the outlet valve 6,7, which entails a great number of different combinations. This is associated with high production costs for the adjusted cylinder head covers 8 and high installation costs because prior to the execution of the installation steps, it must be verified whether the cylinder head cover 8 suitable for the outlet valve 6,7 is used.

Figure 2A:
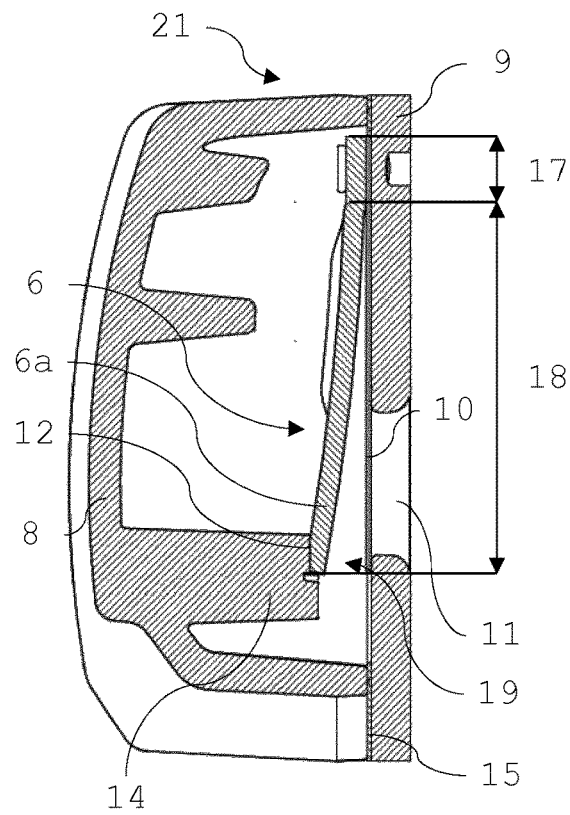
FIG. 2a shows a cutaway view of the cylinder head cover according to the invention with a first outlet valve and an open valve spring.
Figure 3A:
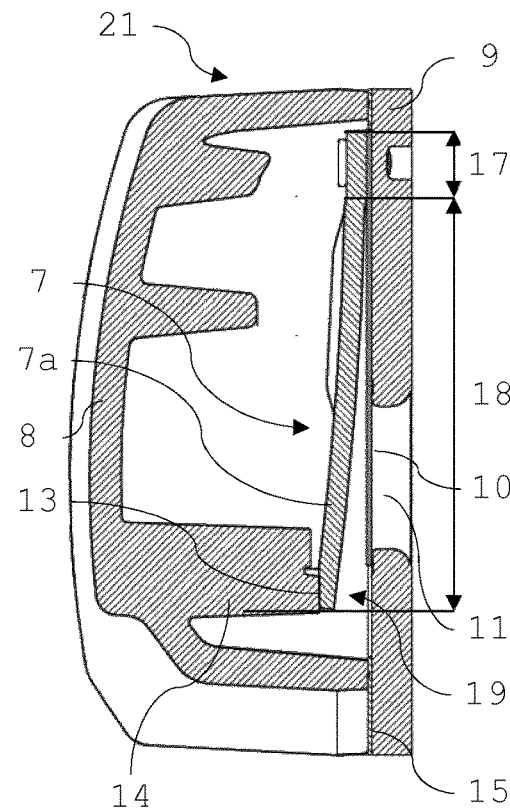
FIG. 3a shows a cutaway view of the cylinder head cover with a second outlet valve and a closed valve spring.
Figure 2B:
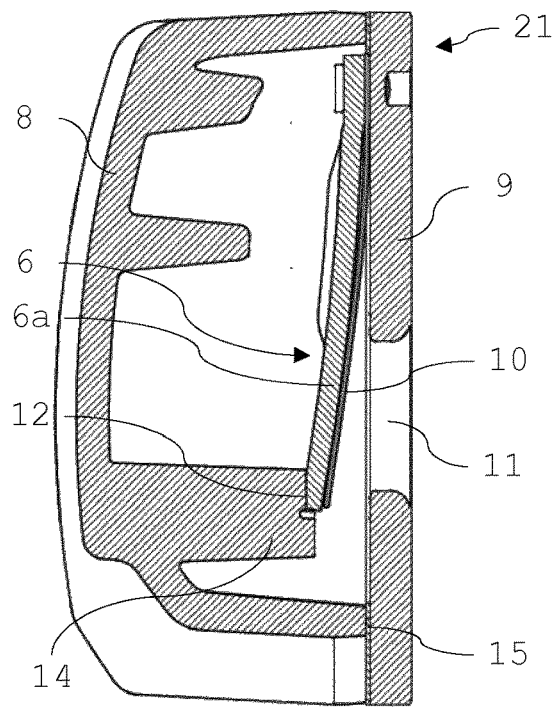
FIG. 2b shows the cylinder head cover according to FIG. 2a with a closed valve spring.
Figure 3B:
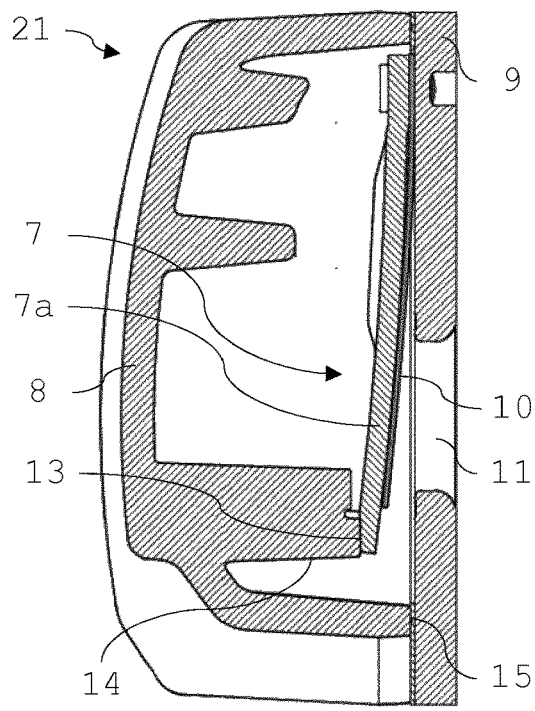
FIG. 3b shows the cylinder head cover according to FIG. 3a with an open valve spring.

FIGS. 2a and 2b show a cross-section of the cylinder head arrangement 21 with a first outlet valve 6 and the cylinder head cover 8 according to the invention; FIGS. 3a and 3b show a cross-section of the cylinder head arrangement 21 with a second outlet valve 7 and the cylinder head cover 8 according to the invention. As can be clearly seen, when comparing FIGS. 2 and 3, the above described disadvantages of the prior art are overcome in that the cylinder head cover 8 has a plurality of contact surfaces 12,13, which are each provided for a different outlet valve 6,7.

In the depicted embodiment, the cylinder head cover 8 has two contact surfaces 12,13 for the stop plates 6a,7a of two different outlet valves 6,7. In alternative embodiments, more than two contact surfaces, for example, three, four, or five contact surfaces, can be provided. Since the first contact surface 12 is designed for contacting the first stop plate 6a of the first outlet valve 6, and the second contact surface 13 is designed for contacting the second stop plate 7a of the second outlet valve 7, two different outlet valves 6,7 can be positioned in the cylinder head arrangement 21 with structurally identical cylinder head covers 8. In other words, the cylinder head cover 8 can be used in different coolant compressors or coolant compressor types, which each require different opening positions of the valve spring 10 and thus have different outlet valves 6,7.

Figure 4:
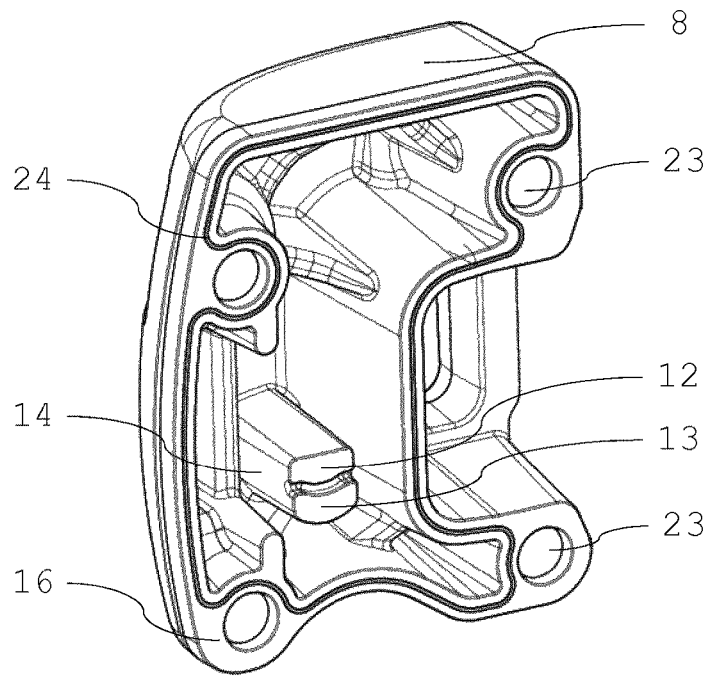
FIG. 4 shows an axonometric drawing of a cylinder head cover according to the invention.

The contact surfaces 12,13 are naturally arranged in the internal space of the cylinder head cover 8, which forms the hollow space, and face the valve plate 9. In the present embodiment, the cylinder head cover 8 has a support element 14 which forms the contact surfaces 12,13. The cylinder head cover 8, together with the support element 14, is designed as a single-piece cast part, wherein the support element 14 protrudes from the cover surface of the cylinder head cover 8 in the direction of the valve plate 9. On the side facing the valve plate 9, the cylinder head cover 8 has a continuous sealing surface 16 in order to seal the formed hollow space by means of the sealing element 15 which is arranged between the cylinder head cover 8 and the valve plate 9. As can be seen in FIG. 4, the basically flat sealing surface 16 has a continuous bulge 24 which increases the surface pressure on the sealing element 15, thus securing the sealing element 15 between cylinder head cover 8 and valve plate 9 and preventing the sealing element 15 from being pushed out during operation.

The two contact surfaces 12,13 are formed by a stepped recess of the support element 14, wherein the contact surfaces 12,13 are aligned parallel to the valve plate 9 or parallel to the sealing surface 16. In alternative embodiments, it can also be provided that the contact surfaces 12,13 are aligned parallel to one another, but run obliquely with regard to the sealing surface 16, or that the contact surfaces 12,13 are designed to be curved, for example, to correspond to the shape of the stop plates 6a,7a. The described possibilities for the arrangement and design of the first and second contact surface 12,13 can be applied to any number of contact surfaces.

FIGS. 2a and 3a clearly show that the stop plates 6a,7a of the outlet valves 6,7 are designed differently, while the valve springs 10 are designed to be structurally identical. It goes without saying that the outlet valves 6,7 can also have differently designed valve springs 10. The two outlet valves 6,7 are in a closed position, in which the outlet opening 11 is closed by the valve spring 10. As a rule, the outlet valves 6,7 assume this position during the suction stroke and during compression, before the valve springs 10 yield to the dynamic pressure and assume the opening position.

Figure 5:
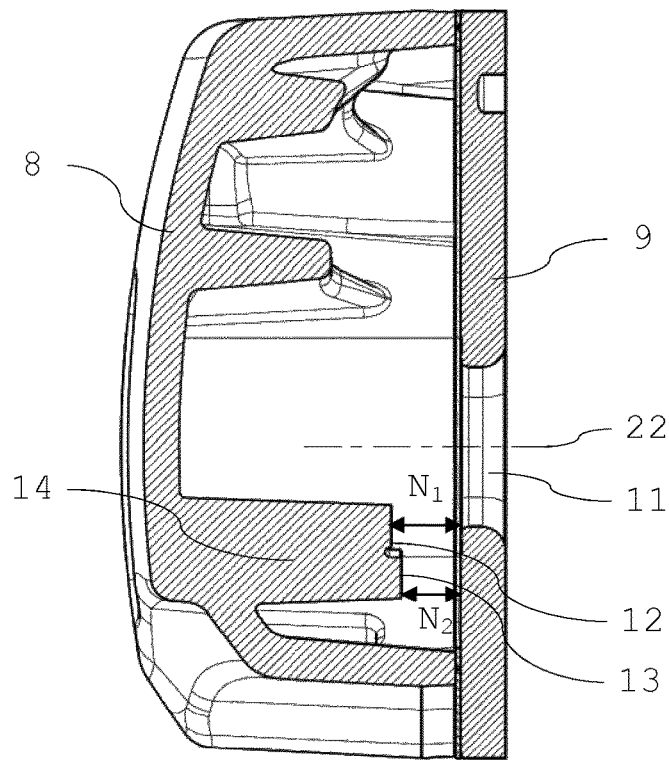
FIG. 5 shows a cutaway view of the cylinder head cover without an outlet valve.

In order to clarify the arrangement of the contact surfaces 12,13, FIG. 5 shows the cylinder head cover 8, which is fastened to the valve plate 9, without an outlet valve 6,7. It can be clearly seen that the first contact surface 12 is arranged at a first standard distance $N_1$, and the second contact surface 13 is arranged at a second standard distance $N_2$ to the valve plate 9 or the sealing surface 16. The first contact surface 12 is arranged closer to the longitudinal axis 22 of the outlet opening 11, i.e., it has a shorter distance to the longitudinal axis 22 in radial direction (with regard to the longitudinal axis 22). The first standard distance $N_1$ is also greater than the second standard distance $N_2$, and so, with regard to the valve plate 9, the first contact surface 12 lies higher up than the second contact surface 12. In the present embodiment, the first standard distance $N_1$ of the first contact surface 12 is 6.1 mm, while the second standard distance $N_2$ of the second contact surface 13 is 5.2 mm. If a third and fourth contact surface were provided, the third contact surface would have a shorter standard distance than the second contact surface, and the fourth contact surface would have a shorter standard distance than the third contact surface, and so the contact surface with the greatest radial distance to the longitudinal axis 22 has the shortest standard distance to the valve plate 9.

These different standard distances $N_1, N_2$ ensure that the first stop plate 6a bearing against the first contact surface 12 (FIGS. 2a and 2b) allows for a greater opening of the valve spring 10 (FIG. 2b) than the second stop plate 7a bearing against the second contact surface 13 (FIG. 3b), wherein the two stop plates 6a,7a have essentially the same thickness. In other words, with the design according to the invention of the two contact surfaces 12,13, it is possible in a simple manner to adjust different opening positions of the valve spring 10, depending on whether a stop plate 6a is provided for the first contact surface 12, or whether a stop plate 7a is provided for the second contact surface 13. A comparison of FIGS. 2b and 3b shows particularly clearly the two different opening positions of the valve springs 10 of the two different outlet valves 6,7, wherein the valve spring 10 of the first outlet valve 6 is open wider in its opening position than the valve spring 10 of the second outlet valve 7.

Figure 6:
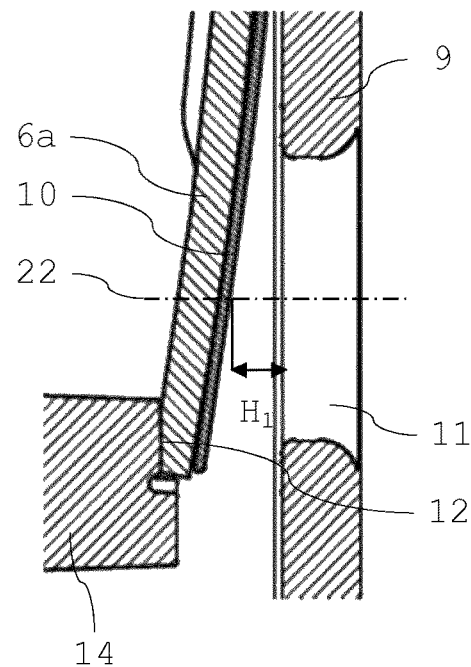
FIG. 6 shows a detailed depiction from FIG. 2b.

In order to clarify this substantive matter, FIG. 6 shows a detailed view of the first outlet valve 6 in the open position (see FIG. 2b), wherein particularly the area around the outlet opening 11 in the valve plate 9 is shown. The first stop plate 6a is supported by the first contact surface 12 of the cylinder head cover 8. A first opening height of the first valve spring 10, measured along the longitudinal axis 22 as the distance between the upper side of the valve plate 9 and the underside of the valve spring 10 which bears against the first stop plate 6a, is indicated. In the present embodiment, the opening height $H_1$ is 2.6 mm, while the second opening height $H_2$ of the second outlet valve 7 (not depicted) is determined analogously and in the present embodiment is 1.6 mm. Conceivable values for the opening height H of the valve spring for coolant compressors with a displacement between 15 cm$^3$ and 21 cm$^3$ are 1.0 mm, 1.2 mm, 1.6 mm, 1.8 mm, 2.6 mm, and 2.8 mm. It goes without saying that each of the contact surfaces 12,13 defines an opening height H of a valve spring 10 of an outlet valve, and any combination of different opening heights H is conceivable. For coolant compressors with a smaller or larger displacement, values deviating from the values indicated above can also be provided for the opening height H.

It is also clearly shown that in the opening position, the valve springs 10 of both outlet valves 6,7 bear against the corresponding stop plate 6a,7a with their entire surface, and the stop plates 6a,7a are curved such that they correspond to the bending line of the valve springs 10. The stop plates 6a,7a each comprise a fastening section 17, by means of which the stop plates 6a,7a are fastened to the valve plate 9, and a free section 18, wherein the free section 18 forms the stop surface for the valve spring 10, as is indicated by way of example in FIGS. 2a and 3a. At the end opposite of the fastening section 17, the free section 18 has an end portion 19 which is in mesh with one of the contact surfaces 12,13. As can be seen in FIGS. 2 and 3, the contact surfaces 12,13 are arranged on the side of the outlet opening 11 which is opposite of the fastening section 17, and so the stop plates 6a,7a are supported on both ends. The fastening section 17, together with a fastening section of the valve spring 10, is riveted to the valve plate 9.

The first stop plate 6a differs from the second stop plate 7a particularly with regard to the length, i.e. the extension from the end portion 19 to the opposite end of the fastening section 17, and with regard to the curvature. As a result, the contact with one of the contact surfaces 12,13 can be ensured in a simple manner by the dimensioning of the length and the curvature of the stop plates 6a,7a in accordance with the standard distance and the radial distance of the contact surfaces 12,13.

FIG. 4 shows a three-dimensional drawing of the cylinder head cover 8 according to the invention, showing particularly the arrangement of the contact surfaces 12,13 and the design of the support element 14. It further shows the sealing surface 16 and the, in this embodiment, four fastening openings 23 which are arranged on the side of the cylinder head cover 8 that faces the valve plate 9. The fastening openings 23, which correspond to corresponding openings in the valve plate 9 and threaded holes in the cylinder housing 3, are used to receive fastening means, such as screws, by means of which the cylinder head cover 8 is fastened to the cylinder housing 3. By tightening the fastening means, the sealing element 15 is deformed to seal the hollow space and the cylinder, and the stop plate 6a,7a is elastically deformed and thus pre-stressed by the contact with the contact surface 12,13.

LIST OF REFERENCE SIGNS

1 Compressor housing
2 Electric drive unit
3 Cylinder housing
4 Piston
5 Crankshaft
6 First outlet valve
   6a First stop plate
7 Second outlet valve
   7a Second stop plate
8 Cylinder head cover
9 Valve plate
10 Valve spring
11 Outlet opening
12 First contact surface
13 Second contact surface
14 Support element
15 Sealing element
16 Sealing surface
17 Fastening section
18 Free section
19 End portion of the free section
20 Suction silencer
21 Cylinder head arrangement
22 Longitudinal axis of the outlet opening 11
23 Fastening opening
24 Bulge

What is claimed is:

1. A compressor family of coolant compressors with the coolant compressors having a different cooling capacity due to different displacements, wherein each of the coolant compressors comprises an electric drive unit, a cylinder housing with a cylinder head arrangement, a cylinder head cover, a crankshaft drivable by the electric drive unit, and a piston driven by the crankshaft, guided in the cylinder housing and compressing the coolant, wherein the cylinder head cover is fastened to the cylinder head arrangement in order to form a hollow space for receiving a coolant compressed by the piston, wherein the cylinder head arrangement comprises a valve plate attached to the cylinder housing with an outlet opening and an outlet valve, which closes the outlet opening in cycles and comprises a valve spring and a stop plate for delimiting an opening movement of the valve spring, wherein the cylinder head cover comprises at least two contact surfaces for supporting stop plates of different outlet valves in order to allow for different opening positions of valve springs of the different outlet valves, and wherein the stop plate is attached to the valve plate and is supported on one of the at least two contact surfaces, wherein, depending on a displacement of the piston of each coolant compressor of the compressor family, a different outlet valve is attached to the valve plate, wherein the cylinder head cover supports stop plates of the different outlet valves on different contact surfaces of the at least two contact surfaces, and so structurally identical cylinder head covers are used for the entire compressor family.

2. The coolant compressors according to claim 1, wherein the cylinder head cover has a support element which forms the at least two contact surfaces, which are adjacent contact surfaces that are formed in and adjacent to a recess of the support element.

3. The coolant compressors according to claim 2, wherein the support element comprises a first and a second contact surface of the at least two contact surfaces, wherein the first contact surface of the at least two contact surfaces is designed to support a stop plate of a first outlet valve of the different outlet valves in order to adjust a first opening position of the valve spring of the first outlet valve, and wherein the second contact surface of the at least two contact surfaces is designed to support the stop plate of an alternative outlet valve of the different outlet valves in order to adjust an alternative opening position of a valve spring of the alternative outlet valve.

4. The coolant compressors of claim 2 wherein the recess of the support element is formed by a step.

5. The coolant compressors according to claim 1, wherein the cylinder head cover comprises a continuous sealing surface for sealing the hollow space delimited by the valve plate, and that the at least two contact surfaces are arranged at a varying standard distance ($N_1, N_2$) from the sealing surface.

6. The coolant compressors according to claim 5, wherein a height difference between a first contact surface of the at least two contact surfaces arranged closest to the sealing surface and a second contact surface of the at least two contact surfaces arranged furthest from the sealing surface lies in a range between 0.2 mm and 2.6 mm.

7. The coolant compressors of claim 6 wherein the range is between 0.4 mm and 2.0 mm.

8. The coolant compressors of claim 6 wherein the range is between 0.6 mm and 1.6 mm.

9. The coolant compressors of claim 6 wherein the range is between 0.8 mm and 1.2 mm.

10. The coolant compressors according to claim 5, wherein a height difference between two adjacent contact surfaces of the at least two contact surfaces lies between 0.2 mm and 2 mm.

11. The coolant compressors cover of claim 10 wherein the height difference is between 0.4 and 1.6 mm.

12. The coolant compressors of claim 10 wherein the height difference is between 0.8 and 1 mm.

13. The coolant compressors according to claim 1, wherein the at least two contact surfaces are designed to be curved to a shape of the stop plates of the different outlet valves.

14. The coolant compressors of claim 13 wherein the at least two contact surfaces are further designed to fit the shape of the stop plates of different outlet valves.

15. The coolant compressors according to claim 1, wherein the at least two contact surfaces are aligned parallel to one another.

16. The coolant compressors of claim 15 wherein the at least two contact surfaces are parallel to the sealing surface.

17. The coolant compressors according to claim 1, wherein the stop plate comprises a fastening section attached to the valve plate and a free section for delimiting the opening movement of the valve spring, wherein an end portion of the free section bears against one of the contact surfaces.

18. The coolant compressors according to claim 17, wherein the stop plate is pre-stressed between the corresponding contact surface and the valve plate.

19. The coolant compressors according to claim 17, wherein a contact surface of the at least two contact surfaces with a shortest distance from a longitudinal axis of the outlet opening in a radial direction of the outlet opening is arranged at a first standard distance ($N_1$) from the valve plate, and standard distances ($N_2$) of remaining contact surfaces of the at least two contact surfaces are reduced from contact surface to contact surface, the further away they are from the longitudinal axis.

20. The coolant compressors of claim 17 wherein the free section is curved.

21. The coolant compressors according to claim 1, wherein the at least two contact surfaces are arranged relative to the valve plate, such that an opening height ($H_1, H_2$) of the valve spring in an opening position defined by the corresponding contact surface lies between 0.8 mm and 3.0 mm, wherein the opening height ($H_1, H_2$) of the valve spring is defined as a maximum distance between the valve plate and the valve spring, measured along a longitudinal axis of the outlet opening.

22. The coolant compressors of claim 21 wherein the at least two contact surfaces are arranged relative to the valve plate at different standard distances ($N_1, N_2$).

23. The coolant compressors of claim 21 wherein the opening height is between 1.0 mm and 2.8 mm.

24. The coolant compressors of claim 21 wherein the opening height is between 1.2 mm and 2.6 mm.

25. The coolant compressors of claim 21 wherein the opening height is between 1.6 mm and 1.8 mm.

26. The compressor family of coolant compressors according to claim 1, wherein lengths of free sections of the stop plates of the different outlet valves differ from one another.

* * * * *